(12) United States Patent
Jung et al.

(10) Patent No.: US 10,194,041 B2
(45) Date of Patent: Jan. 29, 2019

(54) IMAGE FORMING APPARATUS, MOBILE DEVICE, METHOD FOR CLASSIFYING DOCUMENT, AND COMPUTER READABLE RECORDING MEDIUM

(71) Applicant: S-Printing Solution Co., Ltd., Suwon-si, Gyeonggi-do (KR)

(72) Inventors: Joo-young Jung, Suwon-si (KR); So-hye Kim, Suwon-si (KR); Chang-hyung Lee, Seoul (KR)

(73) Assignee: S-Printing Solution Co., Ltd., Suwon-si (KR)

( * ) Notice: Subject to any disclaimer, the term of this patent is extended or adjusted under 35 U.S.C. 154(b) by 0 days.

(21) Appl. No.: 15/360,341

(22) Filed: Nov. 23, 2016

(65) Prior Publication Data
US 2017/0155783 A1    Jun. 1, 2017

(30) Foreign Application Priority Data
Nov. 26, 2015    (KR) .......................... 10-2015-0166354

(51) Int. Cl.
*H04N 1/00*    (2006.01)
*G06K 9/00*    (2006.01)

(52) U.S. Cl.
CPC ..... *H04N 1/00633* (2013.01); *G06K 9/00456* (2013.01); *H04N 1/0032* (2013.01); *H04N 1/00591* (2013.01); *G06K 2209/01* (2013.01); *H04N 2201/0081* (2013.01); *H04N 2201/0094* (2013.01)

(58) Field of Classification Search
CPC ................................................. H04N 1/00633
USPC ................................................ 358/1.15, 1.13
See application file for complete search history.

(56) References Cited

U.S. PATENT DOCUMENTS

| | | | | |
|---|---|---|---|---|
| 2011/0292453 | A1* | 12/2011 | Saluja ...................... | B41J 11/46 358/3.28 |
| 2012/0120432 | A1* | 5/2012 | Hirohata ............ | H04N 1/00474 358/1.13 |
| 2016/0134763 | A1* | 5/2016 | Haapanen .............. | H04N 1/001 358/1.15 |
| 2016/0255222 | A1* | 9/2016 | Sakata ............... | H04N 1/00482 358/1.13 |

FOREIGN PATENT DOCUMENTS

| | | |
|---|---|---|
| JP | 05-139616 A | 6/1993 |
| JP | 10-097112 A | 4/1998 |
| JP | 2004-054088 A | 2/2004 |
| JP | 2004-269063 A | 9/2004 |
| JP | 2015-041000 A | 3/2015 |

\* cited by examiner

*Primary Examiner* — Jacky X Zheng
(74) *Attorney, Agent, or Firm* — Jefferson IP Law, LLP

(57) ABSTRACT

An image forming apparatus is provided. The image forming apparatus includes a scanner configured to scan a plurality of manuscripts, at least one processor configured to generate classification information of the plurality of manuscripts using a scanning result of the plurality of manuscripts, and a display configured to display guide information of the plurality of manuscripts for manuscript classification using the generated classification information.

18 Claims, 17 Drawing Sheets

FIG. 4

| Job Name | Page Number | Front Side Usable? | Back Side Usable? | Output Bin | Security | Frount side F | Frount side I | Frount side AVG | Back side F | Back side I | Back side AVG | Keyword Index |
|---|---|---|---|---|---|---|---|---|---|---|---|---|
| Scan 1 | 1 Page | Y | N | 2 | N | 0 | 0 | 255 | 2.3 | 2.3 | 254 | -1 |
| Scan 1 | 2 Page | Y | Y | 1 | N | 0 | 0 | 255 | 0 | 0 | 255 | -1 |
| ... | ... | ... | ... | ... | ... | ... | ... | ... | ... | ... | ... | ... |
| Scan 2 | 1 Page | N | Y | 4 | Y | 3.2 | 3.1 | 255 | 0 | 0 | 255 | -1 |
| Scan 2 | 2 Page | N | N | 4 | N | 5.5 | 5.4 | 254 | 6.3 | 6.2 | 252 | -1 |
| Scan 2 | 3 Page | Y | N | 4 | N | 0 | 0 | 255 | 53.4 | 53.2 | 100 | -1 |
| ... | ... | ... | ... | ... | ... | ... | ... | ... | ... | ... | ... | ... |

⟨ Option 2      › Next

710 —
- ⦿ Classification using only scan ADF
  - ☑ Classification by kinds of reusable paper —711
  - ☐ Classification by keywords —712
  - ☐ Security document classification —713

720 —
- ○ Classification using Output Bin
  - Output Bin 1 — [Double-side usable paper ▼]
  - Output Bin 2 — [Front-side usable paper ▼]
  - Output Bin 3 — [Back-side usable paper ▼]
  - Output Bin 4 — [Others ▼]

Double-side usable paper
Front-side usable paper
Back-side usable paper
Usable paper
Unusable paper
Security phrase detection paper
Keyword detection paper
"Drugstore A" detection paper
"Drugstore B" detection paper
"Drugstore C" detection paper
Others

IMAGE FORMING APPARATUS, MOBILE DEVICE, METHOD FOR CLASSIFYING DOCUMENT, AND COMPUTER READABLE RECORDING MEDIUM

CROSS-REFERENCE TO RELATED APPLICATION(S)

This application claims the benefit under 35 U.S.C. § 119(a) of a Korean patent application filed on Nov. 26, 2015 in the Korean Intellectual Property Office and assigned Serial number 10-2015-0166354, the entire disclosure of which is hereby incorporated by reference.

TECHNICAL FIELD

The present disclosure relates to an image forming apparatus, a mobile device, a method for classifying a document, and a computer readable recording medium. More particularly, the present disclosure relates to an image forming apparatus, a mobile device, a method for classifying a document, and a computer readable recording medium, which may classify a hardcopy document using an automatic document feeder (ADF) function of a scanner.

BACKGROUND

In general, an image forming apparatus means an apparatus that prints on a recording paper print data that is generated in a terminal device, such as a computer. Examples of such an image forming apparatuses may include a copy machine, a printer, a facsimile, and a multi-function peripheral (MFP) that has multiple functions of the above-described apparatuses in one unit.

In the related art, in order to classify a hardcopy document, a user is required to directly confirm the state of the hardcopy document and to classify the hardcopy document sheet by sheet. In particular, in the case of using a bundle of manuscripts having printing history as reusable paper, the user is required to confirm whether the hardcopy document is printable reusable paper sheet by sheet and to arrange the hardcopy document so that a printable side thereof is arranged on one side.

However, it is troublesome to classify a large number of sheets of reusable paper one by one, and due to the user's mistake that is caused by the characteristics of a simple job, there is a possibility that unprintable hardcopy document is mixed in with the reusable paper, or a printable side of the reusable paper is incorrectly arranged as an opposite side thereof. If such a mistake is made, the print job should be re-performed causing the user inconvenience. Further, the user may be aware of such a mistake only after confirming the result of printing output, and this may cause the inconvenience to be increased.

Further, in order to solve the above-described problem, a dedicated device that may automatically classify the document may be purchased to be used. However, it is not easy for a general user to use this method on the point that an additional cost occurs and a separate installation space for the corresponding device may be necessary.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an image forming apparatus, a mobile device, a method for classifying a document, and a computer readable recording medium, which may classify a hardcopy document using an automatic document feeder (ADF) function of a scanner.

In accordance with an aspect of the present disclosure, an image forming apparatus is provided. The image forming apparatus includes a scanner configured to scan a plurality of manuscripts, at least one processor configured to generate classification information of the plurality of manuscripts using a scanning result of the plurality of manuscripts, and a display configured to display guide information of the plurality of manuscripts for manuscript classification using the generated classification information.

In accordance with another aspect of the present disclosure, a mobile device connectable to an image forming apparatus having an automatic data feed (ADF) is provided. The mobile device includes a communication interface configured to transmit a scan command for a plurality of manuscripts that are loaded on the ADF and to receive a scanning result of the plurality of manuscripts, at least one processor configured to generate classification information of the plurality of manuscripts based on the received scanning result, and a display configured to display guide information of the plurality of manuscripts for manuscript classification using the generated classification information.

In accordance with another aspect of the present disclosure, a method for classifying a document of an image forming apparatus is provided. The method includes scanning a plurality of manuscripts, generating classification information of the plurality of manuscripts using a scanning result of the plurality of manuscripts, and displaying guide information of the plurality of manuscripts for manuscript classification using the generated classification information.

In accordance with another aspect of the present disclosure, a computer readable recording medium including a program for executing a method for classifying a document of an image forming apparatus, wherein the method for classifying the document is provided. The computer readable recording medium includes scanning a plurality of manuscripts, generating classification information of the plurality of manuscripts using a scanning result of the plurality of manuscripts, and providing guide information of the plurality of manuscripts for manuscript classification using the generated classification information.

Other aspects, advantages, and salient features of the disclosure will become apparent to those skilled in the art from the following detailed description, which taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 is a diagram illustrating an example of a lookup table that is stored in a storage according to an embodiment of the present disclosure;

FIGS. 5, 6, 7, 8, 9, 10, 11, 12, and 13 are diagrams illustrating various examples of user interface (UI) windows that may be displayed on a display of FIG. 2 or a touch screen of FIG. 3 according to various embodiments of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the terms "first, second, and so forth" are used to describe various constituent elements, such constituent elements are not limited by the terms. The terms are used only to discriminate a constituent element from other constituent elements.

In the description, it should be understood that the term "includes" and/or "is composed of" means that one or more other features, figures, operations, constituent elements, components, combinations thereof, and/or existence or addition thereof are not excluded in addition to the described features, operations, constituent elements, components, combinations thereof, and/or existence or addition thereof.

In various embodiments of the present disclosure, the term "module" or "unit", as used herein, means, but is not limited to, software or hardware component or a combination thereof, which performs certain tasks. Further, "a plurality of modules or units" may be integrally formed as at least one module and may be implemented by at least one processor (not illustrated) except for "modules" or "units" that are required to be implemented by specific hardware.

Figure 1:
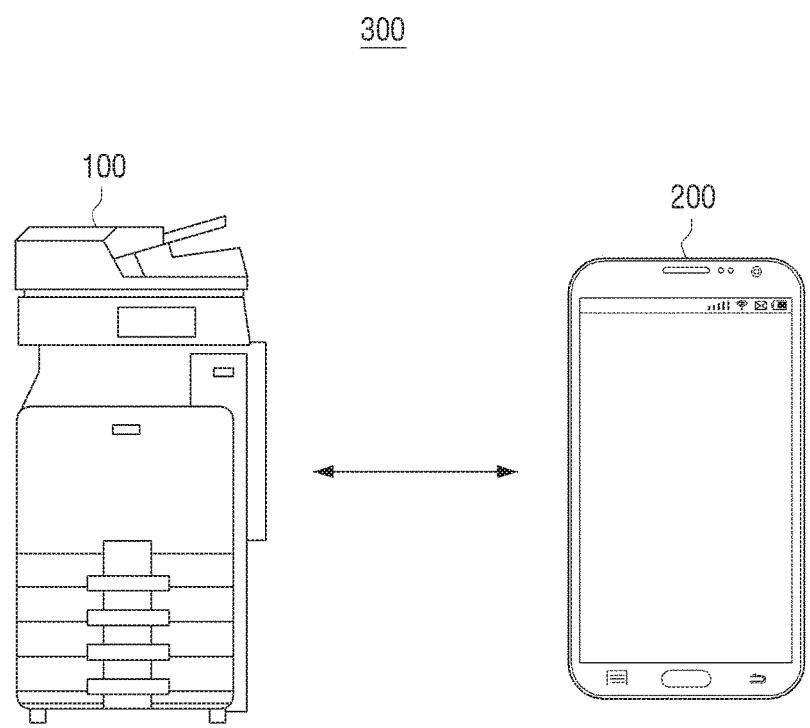
FIG. 1 is a diagram illustrating an image forming system according to an embodiment of the present disclosure.

FIG. 1 is a diagram illustrating an image forming system according to an embodiment of the present disclosure.

Referring to FIG. 1, an image forming system 300 includes an image forming apparatus 100 and a mobile device 200.

The mobile device 200 displays a user interface (UI) for controlling functions of the image forming apparatus 100, and receives an input of user manipulation for the image forming apparatus 100 through the displayed UI. The user manipulation may be a document classification command, and more specifically, may be a reusable paper classification command or a keyword classification command.

Further, the mobile device 200 may transmit an input control command to the image forming apparatus 100. The control command may be a scan command for manuscripts loaded on a manuscript feeder of a scanner or a document classification command. The detailed configuration and operation of the mobile device 200 will be described later with reference to FIG. 3. The mobile device 200 may not only be a movable portable device, such as a notebook computer, a portable phone, a smart phone, a portable media player (PMP), or a Moving Picture Experts Group phase 1 or phase 2 (MPEG-1 or MPEG-2) audio layer 3 (MP3) player, but also a device, such as a personal computer (PC).

The mobile device 200 may receive the scanning result from the image forming apparatus 100 corresponding to transmission of the scan command, and may generate classification information of the manuscripts in accordance with the received scanning result. The scanning result may be a scan image or the classification information. That is, the image forming apparatus 100 may perform classification of a document, and the mobile device 200 may receive only the classification result.

Further, the mobile device 200 may provide guide information for manuscript classification using the generated classification information to a user. The guide information may be information for providing the classification result (e.g., information on whether unusable reusable paper exists and arrangement position if there exists the unusable reusable paper) itself for a plurality of manuscripts, and may be manipulation guide information for performing an additional classification job. For example, if output trays (or finishers) are not provided in the image forming apparatus 100, the mobile device 200 may provide guide information for loading the plurality of scanned manuscripts again on the manuscript feeder of the scanner, and may provide the image forming apparatus 100 with a control command for loading the plurality of manuscripts that are loaded on the manuscript feeder successively in the unit of manuscripts having the same classification information.

If the output trays are provided in the image forming apparatus 100, the mobile device 200 may provide guide information for loading the plurality of scanned manuscripts on a paper feeder, and may transmit a control command for loading the plurality of scanned manuscripts on the output trays that correspond to the classification information to the image forming apparatus 100.

Further, the image forming apparatus 100 receives an input of the control command from the mobile device 200, and performs a function in accordance with the input control command. Specifically, if a scan command is input from the mobile device 200, the image forming apparatus 100 may perform a scanning job for the manuscripts that are loaded on the manuscript feeder of the scanner. Further, the image forming apparatus 100 may provide the job result to the mobile device 200. The detailed configuration and operation of the image forming apparatus 100 will be described later with reference to FIG. 2. The image forming apparatus 100 may be not only a scanner (or image reading device) that may perform only a scan job but also a multi-function peripheral (MFP) that also performs the function of a copy machine.

As described above, the image forming system 300 according to this embodiment may perform the document classification job to save resources and maintenance costs. Further, since the image forming system 300 performs the document classification using a hardware configuration that is basically provided in the image forming apparatus, the image forming system 300 may perform the document classification function only through software upgrade (or specific application installation).

Although it is described that the mobile device 200 generates the classification information with reference to FIG. 1, during implementation, the image forming apparatus side may generate the classification information in accordance with the scanning result, and the mobile device 200 may receive the classification information as the scanning result.

Although it is described that the document classification is performed in a manner that the mobile device 200 receives an input of the user manipulation command and transmits a corresponding control command to the image forming apparatus 100 with reference to FIG. 1, during implementation, the user manipulation command may be directly input by the image forming apparatus 100.

During implementation, the respective devices may be directly connected to each other, or may be indirectly connected to each other through a router and other devices (e.g., server). Further, in the illustrated example, the respective devices may be connected to each other not only by wire but also wirelessly.

Figure 2:
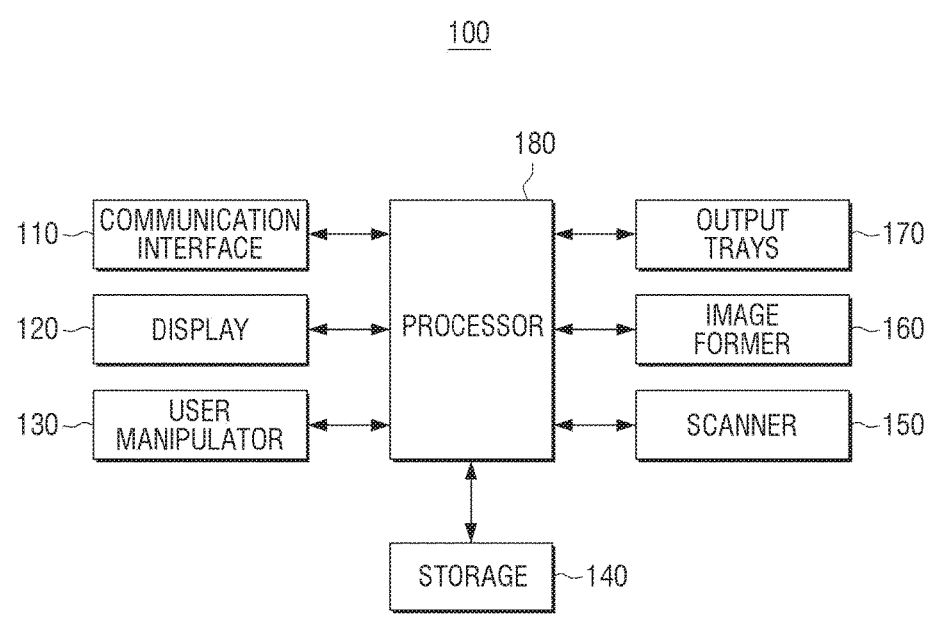
FIG. 2 is a block diagram illustrating a configuration of an image forming apparatus of FIG. 1 according to an embodiment of the present disclosure.

FIG. 2 is a block diagram illustrating a configuration of an image forming apparatus of FIG. 1 according to an embodiment of the present disclosure.

Referring to FIG. 2, the image forming apparatus 100 includes a communication interface 110, a display 120, a user manipulator 130, a storage 140, a scanner 150, an image former 160, output trays 170, and a processor 180. The image forming apparatus 100 may be a facsimile or an MFP that may perform printing, copying, and faxing. Accordingly, the image forming apparatus according to this embodiment may be called an image reading device.

The communication interface 110 may be connected to a terminal device (not illustrated), such as a mobile device (smart phone or tablet PC), a PC, a notebook PC, a personal digital assistant (PDA), or a digital camera, and may receive files and print data from the terminal device (not illustrated). Specifically, the communication interface 110 is formed to connect the image forming apparatus 100 to an external device, and may be connected to the terminal device through not only a local area network (LAN) or the internet but also a universal serial bus (USB) port or a wireless communication (e.g., Wi-Fi 802.11a/b/g/n, near field communication (NFC), or Bluetooth) port.

The communication interface 110 may receive various kinds of control commands from the mobile device 200. In this case, the control commands may be a scan command and a document classification command. Further, the communication interface 110 may transmit the result that corresponds to the received control command to the mobile device 200. The result may be a scan image and/or classification information of a plurality of manuscripts.

Further, the communication interface 110 may transmit a generated digital document to an external device. In this case, if a plurality of digital documents are generated, the communication interface 110 may transmit the plurality of digital documents to other external devices that correspond to respective keywords. For example, a first digital document that is classified and generated as drugstore A may be transmitted to a first external device, and a second digital document that is classified and generated as drugstore B may be transmitted to a second external device.

The display 120 displays thereon various kinds of information provided from the image forming apparatus 100. Specifically, the display 120 may display a UI window for selecting various kinds of functions provided from the image forming apparatus 100. Further, the display 120 may display a function control menu for performing the function of the image forming apparatus. The display 120 may be a monitor, such as liquid crystal display (LCD), and may be implemented by a touch screen that may simultaneously perform the function of the user manipulator 130 to be described later.

The display 120 may display guide information for classifying the scanned manuscripts. Detailed examples of the guide information will be described later with reference to FIGS. 9 and 11.

Further, the display 120 may display a manuscript image that is picked up by the scanner 150. Specifically, if a scan function is selected by the user, the scanner 150 may read the manuscript in a scanning space, and the display 120 may display the read image in real time.

The user manipulator 130 may receive an input of user's function selection and a control command for the corresponding function. The function may include printing, copying, scanning, fax transmission, and document classification.

If a document classification command is input from the user, the user manipulator 130 may receive an input of information on a document classification standard, a keyword, a form, whether to generate a digital document, whether to classify a hard copy, and a transmission address. The document classification command may be a command for hard copy classification only, scan document classification, and a command for both the scan document and hard copy classification. Further, the form may be a document form, for example, such as whether a manuscript is a specification on transaction or an invoice.

The user manipulator 130 as described above may receive an input through a function control menu that is displayed on the display 120. Specifically, the user manipulator 130 is provided with a plurality of function keys through which a user may set or select various kinds of functions supported in the image forming apparatus 100. The user manipulator 130 may be implemented by a plurality of buttons, a keyboard, and/or a mouse, or may be implemented by a touch screen for simultaneously performing the function of the display 120.

Although it is described in this embodiment that the scan command is input through the user manipulator 130, during implementation, the scan command may also be received from the mobile device 200 through the communication interface 110.

The storage 140 may store scan data that is generated by the scanner 150. Further, the storage 140 may store the classification information that is the classification result of manuscripts. The classification information may be stored in the form of a lookup table as illustrated in FIG. 4. Further, the storage 140 may store a digital document in which the classification result of the scan image to be described later has been reflected. Further, the storage 140 may store a template that corresponds to a document form or layout information.

The storage 140 may be implemented by a storage medium in the image forming apparatus 100 or an external storage medium, for example, a removable disk including a USB memory, a storage medium connected to a host, or a web server through a network.

The scanner 150 scans manuscripts. Specifically, the scanner 150 may include an automatic document feeder (ADF) or a duplex ADF (DADF), which has a manuscript feeder and may successively scan the manuscripts. The ADF is a device that may scan one side of each of the manuscripts through successive transport of the manuscripts that are loaded on the manuscript feeder, and the DADF is a device that may simultaneously scan both sides of each of the manuscripts through successive transport of the manuscripts that are loaded on the manuscript feeder. Accordingly, the scanner 150 may generate a one-sided scan image or a double-sided scan image with respect to each of the plurality of manuscripts.

In the case where the scanner 150 is composed of the ADF, the scanner 150 may generate a double-sided scan image of the manuscript through scanning of the other side of each of the plurality of manuscripts after completion of one-sided scanning of each of the plurality of manuscripts. In this case, after a scan job for one side of each of the plurality of manuscripts is completed, the display 120 may display guide information for putting the manuscripts loaded on output trays of the scanner on the manuscript feeder in a direction that is different from the existing direction of the manuscripts.

The scanner 150 may further include a flat bed type scan module in addition to the ADF or DADF. In this case, the ADF scan module and the flat bed type scan module may perform the same function as that of the DADF (double-side scanning) through scanning of different sides of each of the manuscripts together.

The image former 160 may print the print data. Specifically, the image former 160 may perform a print job using printing paper loaded on a paper feeder. In the case where manuscripts are loaded on the paper feeder for classification rather than printing, the image former 160 may perform null printing for outputting the manuscripts to the output tray without an actual printing operation. The null printing is a transport function without forming an image on the paper.

The output trays 170 are configured to transport and load the printing paper that is output from the image former 160 onto any one of the output trays in accordance with a predetermined standard. The output trays 170 may be called finishers, and may be mounted on or separated from the image forming apparatus 100. Further, the output trays 170 may file the plurality of manuscripts loaded on one output tray using a stapler.

The processor 180 controls the respective configurations in the image forming apparatus 100. The processor 180 may be implemented by a central processing unit (CPU), a random access memory (RAM), and a read only memory (ROM), or may be implemented by a single chip, such as ASIC, that internally stores control commands or a plurality of processors.

If a document classification command is input from a user, the processor 180 may control the scanner 150 to perform scanning of the plurality of manuscripts.

Further, if the scanning through the scanner 150 is completed, the processor 180 may classify the manuscript in accordance with a predetermined standard, and may generate classification information of the manuscript. For example, if the classification standard corresponds to reusable paper, the processor may generate the classification information of the manuscript, such as "Usable as reusable paper (1)" or "Unusable as reusable paper (0)". Further, if the classification standard corresponds to double-side scanning, the processor may generate the classification information of the manuscript, such as "Both sides are usable (4)", "Only the front side is usable (3)", "Only the back side is usable (2)", or "Unusable as reusable paper (0)". In this case, the processor 180 may determine whether the manuscript is usable as reusable paper in consideration of the number of black pixels in the scan image, arrangement positions of the black pixels, overall brightness information, and color information. Further, the respective consideration items may be considered (or controlled) in accordance with user's setting.

If the classification standard corresponds to the keyword, the processor 180 may perform optical character recognition (OCR) with respect to the scan images, and may generate the classification information depending on whether the predetermined keyword exists in the result of the OCR. For example, if drugstore A (1) and drugstore B (2) are set as classification information values, the processor 180 may classify a manuscript having a keyword of drugstore A into group A (1), a manuscript having a keyword of drugstore B into group B (2), a manuscript having both keywords of drugstores A and B into group C (3), and a manuscript having neither of the two keywords into group D (4). During implementation, a user may set a region where the OCR is to be performed for fast OCR, and in this case, the processor 180 may perform the OCR only with respect to the region, which is set by the user, of the generated scan image. During implementation, a scan image may be generated only with respect to the region that is set by the user in the process of generating the scan image, and the OCR is performed only with respect to the corresponding overall scan image.

Further, if the classification standard corresponds to the document form, the processor 180 may detect a layout for the scan image, and may generate the classification information through classifying what document corresponds to the detected layout. For example, if a specification on transaction (1) and an invoice (2) are set as the classification information values, the processor 180 may compare the pre-stored layout information that corresponds to the specification on transaction with the layout information extracted from the scan image, and may classify the scan images having the same layout into group A (1). Additionally, the processor 180 may compare the pre-stored layout information that corresponds to the invoice in the same manner with the layout information extracted from the scan image, and may classify the scan images having the same layout as that of the invoice into group B (2).

The processor 180 may successively perform the scan job and the generation of the classification information, or may perform them in parallel by manuscripts. For example, if a scan job for the first page is completed, the processor may simultaneously perform the document classification for the first page while performing the scan control for the second page.

If the classification information for all the manuscripts is generated, the processor 180 may store the generated classification information in the storage 140. Further, the processor 180 may control the display 120 to display guide information for manuscript classification using the generated classification information. If the document classification information is received from the mobile device 200, the processor 180 may transmit information that corresponds to the guide information or the UI to the mobile device 200.

Further, the processor 180 may generate a plurality of digital documents through classification of a plurality of scan images that are scanned corresponding to the generated classification information. For example, if drugstore A (1) and drugstore B (2) are set as the classification information values, the processor 180 may generate the scan image having a keyword of drugstore A among the scan images that are generated by the scanner as the first digital document, and may generate the scan image having a keyword of drugstore B as the second digital document. The digital document may be a file (e.g., jpeg or tiff file) that exists for one manuscript or a file (e.g., tiff, pdf, or xps) that stores the plurality of scan images. In this case, the generated digital document may have a name that corresponds to the classification keyword or a name that is predetermined by a user. For example, the plurality of scan images that are classified into drugstore A may be generated as drugstore A.pdf file.

Further, if the plurality of images have document numbers, the processor 180 may generate a digital document through alignment of the plurality of scan images in the order of the detected document numbers.

Further, the processor 180 may perform a classification job that corresponds to the generated classification information. Specifically, if the user loads the manuscripts on the paper feeder in a state where the image forming apparatus 100 has the output trays 170, the processor 180 may control the image former 160 and the output trays so that the plurality of scanned manuscripts are loaded on the output trays that correspond to the classification information.

The processor 180 may control the image former 160 and the output trays 170 so that predetermined phrases are printed on the manuscripts that are classified through predetermined values of the document classification, and the manuscripts are loaded on the corresponding output trays. For example, if a part of the plurality of manuscripts is the manuscript that requires security, the processor 180 may control the image former 160 to print a phrase, such as "Unusable", on the corresponding manuscript even in the case where one side of the corresponding manuscript is usable.

If the image forming apparatus 100 senses that the user loads the manuscripts on the paper feeder in a state where the image forming apparatus 100 does not have the output trays 170, the processor 180 may control the scanner 150 to output the plurality of manuscripts loaded on the manuscript feeder successively in the unit of manuscripts having the same classification information. In this case, the processor 180 may control the display 120 to display the classification information of the manuscripts that are currently put on an output bin of the scanner 150, and if a confirmation command is input from the user through the user manipulator 130, the processor 180 may control the scanner 150 to output the successive manuscript group having only classification information that is different from the previous classification information. Further, the processor 180 may repeat the above-described operation until all the manuscripts that are loaded on the manuscript feeder are processed.

As described above, the image forming apparatus 100 according to this embodiment may perform the document classification job using the configuration of the image forming apparatus, and thus resources and maintenance costs may be saved. Further, since the document classification is performed using the hardware configuration that is basically provided in the image forming apparatus, it becomes possible to provide the document classification function only through software upgrade (or installation of a specific application).

Figure 3:
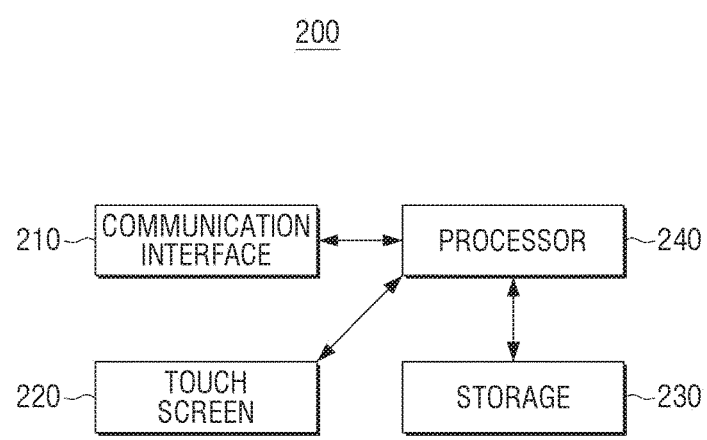
FIG. 3 is a block diagram illustrating a configuration of a mobile device of FIG. 1 according to an embodiment of the present disclosure.

FIG. 3 is a block diagram illustrating a configuration of a mobile device of FIG. 1 according to an embodiment of the present disclosure.

Referring to FIG. 3, a mobile device 200 according to this embodiment may include a communication interface 210, a touch screen 220, a storage 230, and a processor 240.

The communication interface 210 is formed to connect the mobile device 200 to an external device, and may be connected through not only a LAN or the internet but also a USB port or a wireless module. The wireless module may be Wi-Fi, Wi-Fi Direct, NFC, Bluetooth, or infrared (IR).

The communication interface 210 searches for a connectable image forming apparatus 100. Specifically, the communication interface 210 may search for an image forming apparatus 100 that may be connected to the mobile device 200 using the communication type that is supported by the mobile device 200. For example, if the communication interface 210 uses Wi-Fi, the communication interface 210 may search for the image forming apparatus that may be connected through Wi-Fi, whereas it the communication interface 210 supports Wi-Fi and NFC, it may search for the image forming apparatus that may be connected through the respective connection types.

Further, the communication interface 210 receives a UI for function control of the image forming apparatus 100. Specifically, the mobile device 200 according to this embodiment may display a UI for the function control of the image forming apparatus in two types. According to the first embodiment, the mobile device 200 receives the UI itself from the image forming apparatus 100 to display the received UI, and according to the second embodiment, the mobile device 200 receives information (e.g., above-described device information) that is necessary for UI generation from the image forming apparatus, and generates and displays the UI by itself (e.g., virtual graphical user interface (GUI) function) using the received information. Accordingly, if the mobile device 200 is implemented according to the first embodiment, the communication interface 210 may receive the UI for the function control from the image forming apparatus 100.

Further, the communication interface 210 transmits a control command to the image forming apparatus 100. Specifically, the communication interface 210 may transmit a control command that is received from the user through the UI to the image forming apparatus 100. The control command may be a scan command or a document classification command. If the control command is the document classification command, the communication interface 210 may transmit a set value (or classification standard) indicating whether the document classification command is a reusable paper classification command or a keyword classification command to the image forming apparatus 100 together with the classification command. The document classification command may be a command for hard copy classification only, a command for scan document classification, or a command for both the scan document classification and the hard copy classification.

Further, the communication interface 210 receives the scan result. The scan result may be a scan image for a manuscript or classification information that is the document classification result for the manuscript.

Further, the communication interface 210 may transmit a control command for the image forming apparatus to perform manuscript classification according to the classification information to the image forming apparatus 100. Specifically, if the output trays 170 are provided in the image forming apparatus 100, the communication interface 210 may transmit a control command for loading a plurality of scanned manuscripts on the corresponding output trays to the image forming apparatus 100. The control command may be transmitted as successive control commands for the respective manuscripts (i.e., control command for one manuscript) in the order of manuscript arrangement, or may be transmitted as a collective control command for all the manuscripts.

If the output trays 170 are not provided in the image forming apparatus 100, the communication interface 210 may transmit a control command for successively outputting a plurality of manuscripts that are loaded on a manuscript feeder continuously in the unit of manuscripts having the same classification information to the image forming apparatus 100. For example, if the manuscripts are loaded successively in the order of 30 front-side printable sheets, 20 back-side printable sheets, and then 50 front-side printable sheets, the communication interface 210 may transmit a control command for outputting 30 sheets to the image forming apparatus 100, and if a command for requesting a next operation is received from the user, the communication interface 210 may then transmit a control command for outputting 20 sheets to the image forming apparatus 100. Then, if a command for requesting a next operation is again received from the user, the communication interface 210 may transmit a control command for outputting the remaining 50 sheets to the image forming apparatus 100.

Then, the communication interface 210 may transmit a generated digital document to an external device. In this case, if a plurality of digital documents are generated, the communication interface 210 may transmit the plurality of digital documents to other external devices corresponding to respective keywords. For example, a first digital document that is classified and generated as drugstore A may be transmitted to a first external device, and a second digital document that is classified and generated as drugstore B may be transmitted to a second external device.

The touch screen 220 is provided with plural function keys for a user to set or select various kinds of functions that are supported by the mobile device 200, and may display various kinds of information provided from the mobile device 200.

The touch screen 220 receives selection of image forming apparatuses. If there exist a plurality of image forming apparatuses that are connectable to the mobile device 200, the touch screen 220 may display the plurality of connectable image forming apparatuses and may receive selection of one of the connectable image forming apparatuses.

The touch screen 220 displays a UI for function control of the image forming apparatus 100. Specifically, the touch screen 220 may display a UI that is received through the communication interface 210, or may generate and display a UI by itself on the basis of device information that is received through the communication interface 210. The user may input a control command for function control of the image forming apparatus 100 through the displayed UI.

In this case, the touch screen 220 may receive an input of selection of scanning, printing, copying, faxing, and document classification functions that may be performed in the image forming apparatus 100 and options for the corresponding functions through the displayed UI. In this case, the user may input only one function or a plurality of functions. Although scanning, printing, copying, faxing, and document classification have been described as functions that may be performed in the image forming apparatus, during implementation, it is apparent that the image forming apparatus may perform any other function that may be supported by the image forming apparatus in addition to the above-described functions.

If a document classification command is input from the user, the touch screen may receive an input of information on document classification standard, keywords, whether to generate digital documents, whether to classify hard copies, and transmission addresses.

The touch screen 220 may display guide information on the document classification. Detailed examples of guide information will be described later with reference to FIGS. 9 and 11.

The storage 230 may store scan data or classification information that is received through the communication interface 210. Further, the storage 230 may store the classification information that is the job processing result of the processor 240. The classification information may be stored in the form of a lookup table as illustrated in FIG. 4.

Further, the storage 230 may store digital documents in which the classification result of the scan image to be described later has been reflected.

The storage 230 may be implemented by a storage medium in the mobile device 200 or an external storage medium, for example, a removable disk including a USB memory, a storage medium connected to a host, or a web server through a network.

The processor 240 controls the respective configurations in the mobile device 200. The processor 240 may be implemented by configurations, such as a CPU, a RAM, and a ROM, or may be implemented by a single chip, such as application-specific integrated circuit (ASIC), that internally stores control commands.

If a document classification command is input from the user, the processor 240 may control the communication interface 210 to transmit a scan command for the image forming apparatus 100 to perform a scan job with respect to a plurality of manuscripts or a document classification command to the image forming apparatus 100.

Further, if the scan job is completed and a scan image is received from the image forming apparatus 100, the processor 240 may classify the manuscript in accordance with a predetermined classification standard, and may generate classification information of the manuscript. For example, if the classification standard corresponds to reusable paper, the processor may generate the classification information of the manuscript, such as "Usable as reusable paper (1)" or "Unusable as reusable paper (0)". Further, if the classification standard corresponds to double-side scanning, the processor may generate the classification information of the manuscript, such as "Both sides are usable (4)", "Only the front side is usable (3)", "Only the back side is usable (2)", or "Unusable as reusable paper (0)". In this case, the processor 180 may determine whether the manuscript is usable as reusable paper in consideration of the number of black pixels in the scan image, arrangement positions of the black pixels, overall brightness information, and color information. Further, the respective consideration items may be considered (or controlled) in accordance with user's setting.

If the classification standard corresponds to the keyword, the processor 240 may perform OCR with respect to the scan images, and may generate the classification information depending on whether the predetermined keyword exists in the result of the performed OCR. For example, if drugstore A (1) and drugstore B (2) are set as classification information values, the processor 240 may classify a manuscript having a keyword of drugstore A into group A (1), a manuscript having a keyword of drugstore B into group B (2), a manuscript having both keywords of drugstores A and B into group C (3), and a manuscript having neither of the two keywords into group D (4). During implementation, a user may set a region where the OCR is to be performed for fast OCR, and in this case, the processor 240 may perform the OCR only with respect to the region, which is set by the user, of the generated scan image.

If the classification standard corresponds to the document form, the processor 240 may detect a layout for the scan image, and may generate the classification information through classifying what document corresponds to the detected layout. For example, if a specification on transaction (1) and an invoice (2) are set as the classification information values, the processor 240 may classify the scan images having the same layout as that of the specification on transaction into group A (1), and may classify the scan images having the same layout as that of the invoice into group B (2).

The processor 240 may perform reception and classification of the scan image as described above in parallel. For example, if reception of the scan image for the first page is completed, the processor may perform the document classification for the first page simultaneously with receiving the scan image for the second page.

If the classification information for all the manuscripts is generated, the processor 240 may store the generated classification information in the storage 230. Further, the processor 240 may control the touch screen 220 to display guide information for manuscript classification using the generated classification information.

Further, the processor 240 may control the communication interface to transmit a control command that corresponds to the classification job to the image forming apparatus 100 so that the classification job that corresponds to the generated classification information is performed in the image forming apparatus 200. Specifically, if the image forming apparatus 100 is provided with output trays 170 and receives a command for confirming that the manuscripts have been loaded on a paper feeder from the user, the processor 240 may control the communication interface 210 to transmit a control command for loading the respective scanned manuscripts on the output trays corresponding to the classification information to the image forming apparatus 100.

The processor 240 may control the communication interface 210 to transmit a print command for printing a predetermined phrase on the manuscripts that are classified into predetermined values during the document classification and loading the printed manuscripts on the corresponding output trays to the image forming apparatus 100. For example, if a part of the plurality of manuscripts is a manuscript that requires security, the processor 240 may not handle the corresponding manuscript as reusable paper even in the case where one side of the corresponding manuscript is usable as reusable paper. Further, the processor 240 may control the communication interface 210 to print a phrase, such as "Unusable", on the page that corresponds to the reusable paper of the corresponding manuscript.

If the image forming apparatus 100 is not provided with the output trays 170 and receives a command for confirming that the manuscripts have been loaded on a manuscript feeder from the user, the processor 240 may control the communication interface 210 to transmit a control command for outputting a plurality of manuscripts loaded on the manuscript feeder successively in the unit of manuscripts having the same classification information to the image forming apparatus 100. In this case, the processor 240 may control the touch screen 220 to display the classification information of the manuscripts that are currently put on an output bin of the scanner, and if a confirmation command is input from the user through the touch screen 220, the processor 240 may control the communication interface 210 to transmit a control command for outputting the successive manuscripts having only classification information that is different from the previous classification information to the image forming apparatus 100. Further, the processor 240 may repeat the above-described operation until all the manuscripts that are loaded on the manuscript feeder are processed.

If a user's document classification command corresponds to classification of a scan document or "classification of a scan document and a hardcopy document", the processor 240 may generate a plurality of digital documents through classification of a plurality of scan images that are scanned corresponding to the generated classification information. For example, if drugstore A (1) and drugstore B (2) are set as the classification information values, the processor 240 may generate the scan images having a keyword of drugstore A among the scan images that are generated by the scanner as the first digital documents, and may generate the plurality of scan images having a keyword of drugstore B as the second digital documents. The digital document may be a document file (e.g., jpeg or tiff file) that exists for one manuscript or a document file (e.g., tiff, pdf, or xps) that stores the plurality of scan images. In this case, the generated digital document may have a name that corresponds to the classification keyword or a name that is predetermined by a user. For example, the plurality of scan images that are classified into drugstore A may be generated as drugstore A.pdf file.

As described above, the mobile device 200 according to this embodiment may perform the document classification job using the configuration of the image forming apparatus, and thus resources and maintenance costs may be saved. Further, since the document classification is performed using the hardware configuration that is basically provided in the image forming apparatus, it becomes possible to provide the document classification function only through installation of a new application in the mobile device 200.

FIG. 4 is a diagram illustrating an example of a lookup table that is stored in a storage according to an embodiment of the present disclosure.

Referring to FIG. 4, the lookup table includes information on page number for each manuscript, whether a front side is usable, whether a back side is usable, output bin, whether a document is security document, document brightness information of a front side, document brightness information of a back side, and whether a specific keyword exists.

The output bin is the final result value in accordance with whether the front side is usable and whether the back side is usable, and during implementation, the lookup table may store only the output bin. Further, whether the front side is usable is the result in accordance with the document brightness information of the front side, and during implementation, the lookup table may store only whether the front side is usable or only the document brightness information of the front side. Further, whether the back side is usable is the result in accordance with the document brightness information of the back side, and during implementation, the lookup table may store only whether the back side is usable or only the document brightness information of the back side.

FIGS. 5, 6, 7, 8, 9, 10, 11, 12, and 13 are diagrams illustrating various examples of UI windows that may be displayed on a display of FIG. 2 or a touch screen of FIG. 3 according to various embodiments of the present disclosure.

Figure 5:
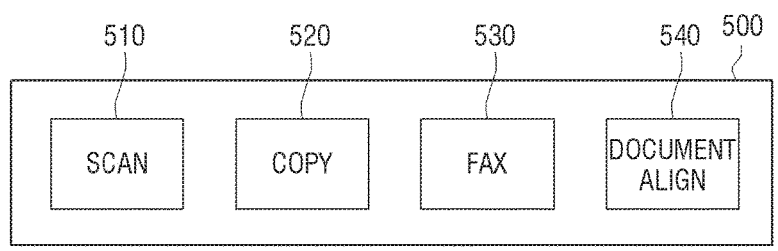

FIG. 5 illustrates an example of a UI window for selecting functions of an image forming apparatus according to an embodiment of the present disclosure.

Referring to FIG. 5, a UI window 500 includes a plurality of regions for selecting functions that may be performed in the image forming apparatus. Specifically, the UI window 500 may include a scan region 510, a copy region 520, a fax region 530, and a document alignment region 540.

The scan region 510 is a region for receiving an input of a user scan command for performing scan function of the image forming apparatus.

The copy region 520 is a region for receiving an input of a copy command for performing a copy function of the image forming apparatus.

The fax region 530 is a region for receiving an input of a fax command for performing faxing of the image forming apparatus.

The document alignment region 540 is a region for receiving an input of a document alignment command for performing document alignment according to this embodiment. If the document alignment function region 540 is selected, a UI window as shown in FIG. 6 may be displayed.

The UI window 500 as shown in FIG. 5 may be displayed on the image forming apparatus 100 or the mobile device 200. For convenience in explanation, it is assumed that the UI window 500 is displayed on the mobile device 200.

Accordingly, the UI window 500 as shown in FIG. 5 may be displayed in the case where an image forming apparatus application is driven.

Figure 6:
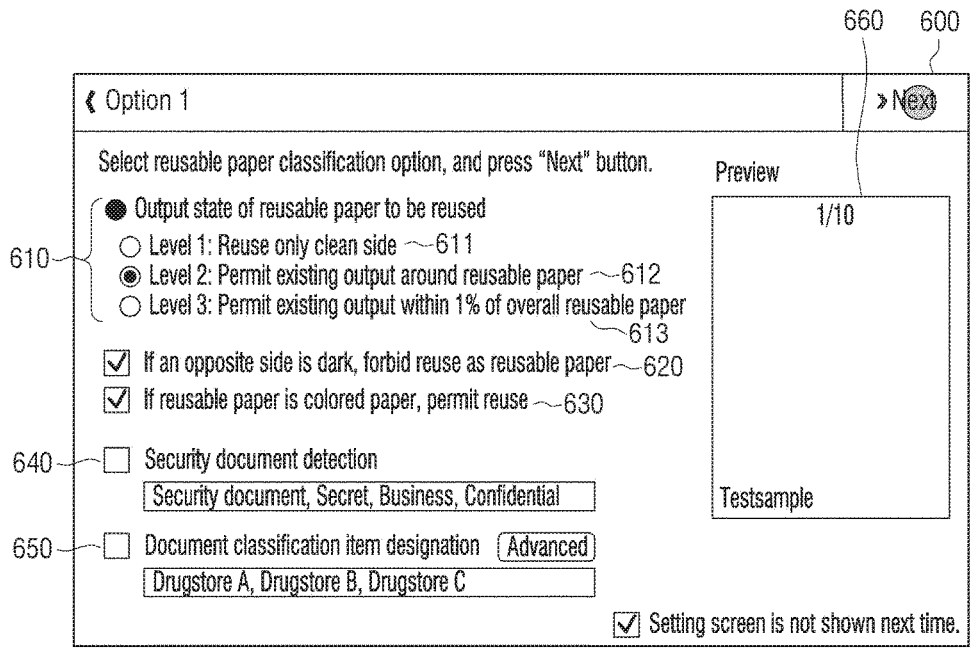

FIG. 6 illustrates an example of a UI window that may be displayed in the case where a document alignment region of FIG. 5 is selected according to an embodiment of the present disclosure.

Referring to FIG. 6, a UI window 600 includes a plurality of regions 610, 620, 630, 640, and 650 for receiving various kinds of settings that are required for the manuscript alignment.

The first region 610 is a region for setting reusable paper classification, and includes sub regions 611, 612, and 613 for selecting the reusable paper classification standard.

Specifically, the processor 240 acquires a scan red, green, and blue (RGB) value of an acquired image, and if there is no dark value that is lower than specific brightness based on the darkest value, the processor 240 determines that the manuscript is a usable manuscript (or reusable paper or blank paper). In this case, the classification standard may be changed from a case where there is no dark pixel that is determined as a blank paper to a case where the dark pixel value is equal to or lower than a specific level "level 3" 613.

The second region 620 is a region for selecting whether to determine the manuscript as a usable manuscript in the case where one side of the manuscript has no black pixel, but the printing shows through on the back side. Specifically, the processor 240 acquires the scan RGB value of the acquired image, and if the rate of the dark value that is lower than the specific brightness is higher than a predetermined reference value B based on the darkest value among R, G, and B, the processor 240 may determine that the manuscript is unusable paper. This is to prevent user's dissatisfaction that may be caused by the use of reusable paper of which one side is blank, but the other side has too large of a printed area.

The processor 240 acquires the scan RGB value of the acquired image, and if the rate of the dark value that is lower than the specific brightness based on the darkest value of RGB is between the predetermined reference values B and a predetermined reference value A, the processor 240 records that the side is a used side as the classification information.

The third region 630 is a region for selecting whether to determine the manuscript that is a colored paper as a usable manuscript.

The fourth region 640 is a region for setting security document classification, and may receive an input of a specific keyword related to security through a lower end thereof.

The fifth region 650 is a region for setting the keyword classification, and may receive an input of the keyword through a lower end thereof.

Further, the UI window 600 may further include a region 660 for displaying a preview screen.

If a user selects the classification standard using the plurality of regions 610, 620, 630, 640, and 650, a UI window as shown in FIG. 7 may be displayed.

Although FIG. 6 shows whether the manuscript is reusable paper, whether a keyword exists, and whether a supplement document exists as the classification type, during implementation, the selection may be made through a layout form, that is, document form, as the classification type.

FIG. 7 illustrates an example of a UI window for selecting a classification type according to an embodiment of the present disclosure.

Referring to FIG. 7, a UI window 700 includes a region 710 for setting the classification type, and a region 720 for designating output trays corresponding to the result of classification.

The region 710 for setting the classification type is a region for selecting one classification type among reusable paper classification 711, keyword classification 712, and a security document classification 713.

The region 720 for designating the output trays is a region for selecting the output trays that correspond to the respective classification types. This region may be displayed only in the case where the output trays are provided in the image forming apparatus 100.

Figure 8:
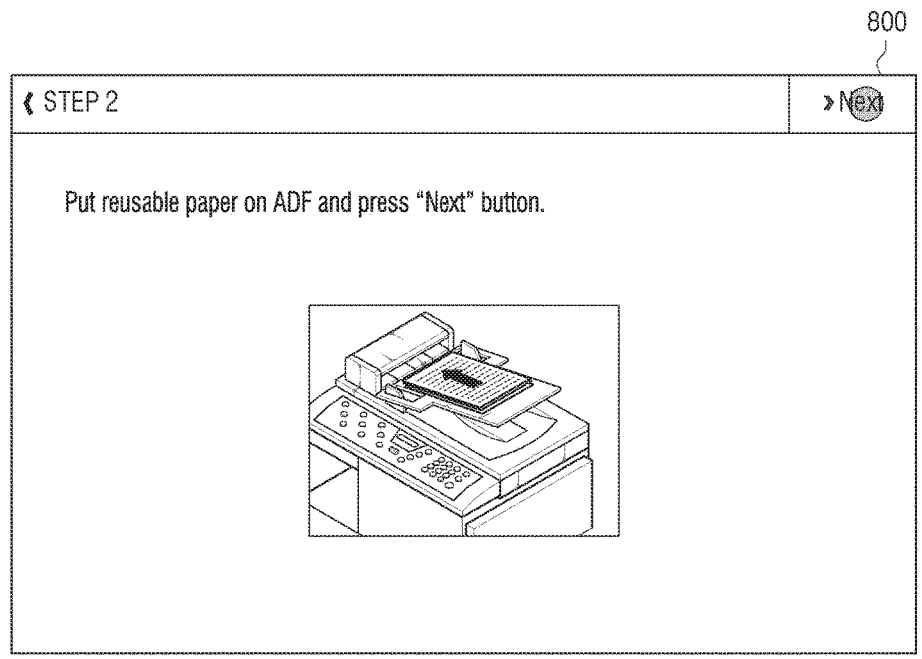
Figure 9:
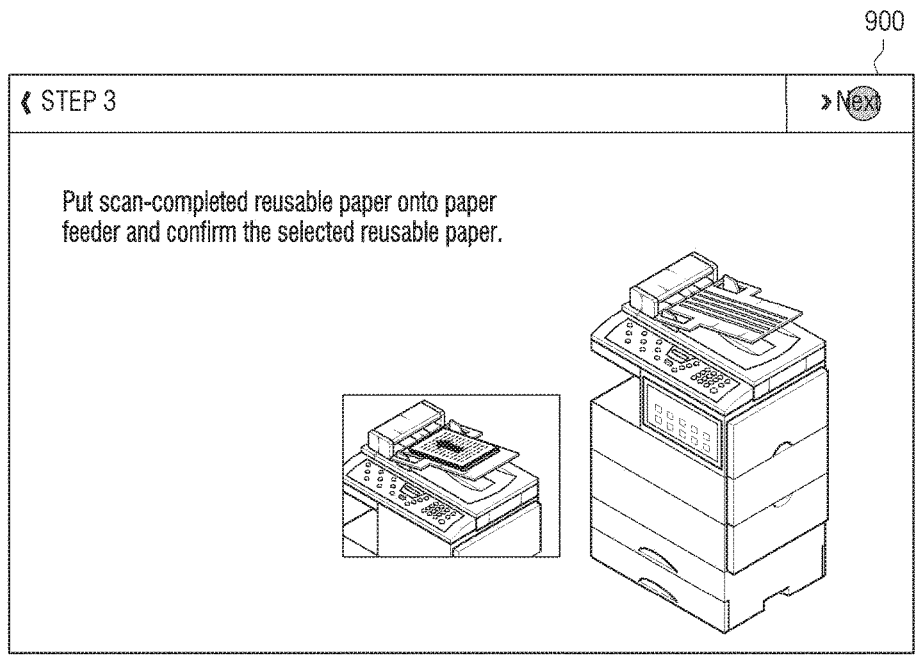
Figure 10:

FIGS. 8, 9, and 10 are guide manuals that may be displayed in a case where output trays are provided in an image forming apparatus according to various embodiments of the present disclosure.

Referring to FIG. 8, a UI window 800 displays information for notifying loading of manuscripts on a manuscript feeder of a scanner. Specifically, the UI window 800 may display guide information for notifying a user of putting of manuscripts on a feeder using a text and a picture for user's easy understanding.

Referring to FIG. 9, if scanning of all the manuscripts is completed, a UI window 900 displays information for notifying a user of loading of a plurality of manuscripts that are put on an output bin on a paper feeder. Specifically, the UI window 900 may display guide information for notifying a user of putting of manuscripts on a paper feeder using a text and a picture for user's easy understanding.

Referring to FIG. 10, a UI window 1000 displays the result of classification. Specifically, the UI window 1000 includes a region 1010 for indicating the classification state of manuscripts that are put on the respective output trays and saving information 1020 through recycling of reusable paper.

As described above, since the saving information is displayed together with the classification result, the user is further inspired to use reusable paper.

Figure 11:
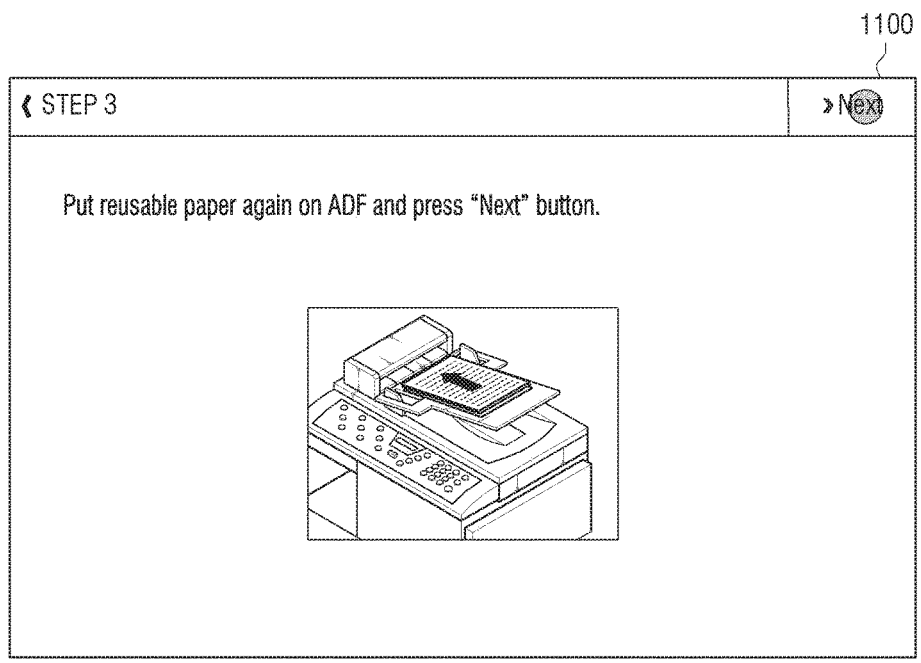
Figure 12:
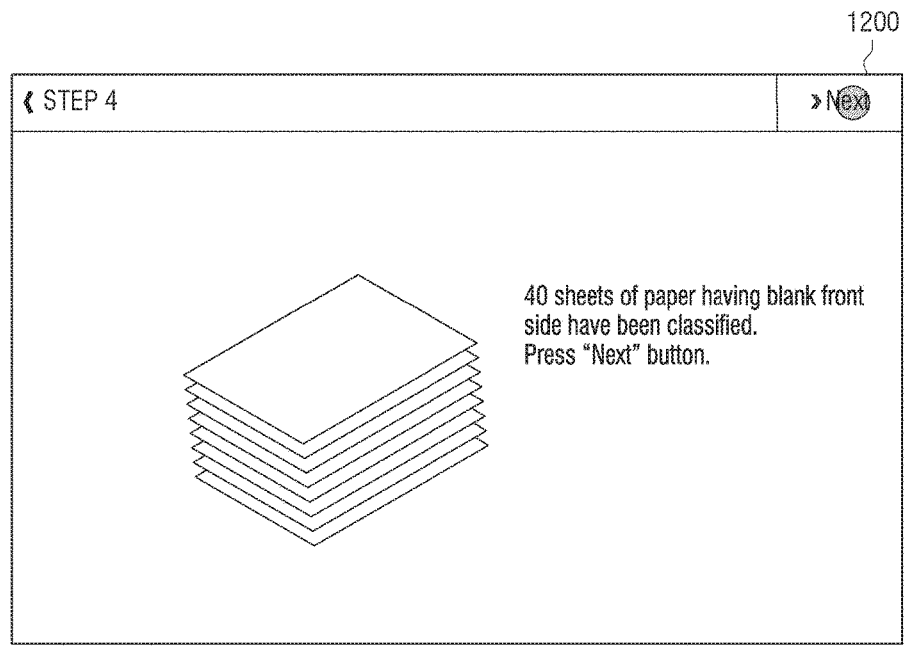

FIGS. 11 and 12 are guide manuals that may be displayed in a case where output trays are provided in an image forming apparatus according to various embodiments of the present disclosure.

Referring to FIG. 11, a UI window 1100 displays information for notifying loading of a plurality of manuscripts that are put on an output bin again on a manuscript feeder of a scanner. Specifically, the UI window 1100 may display guide information for notifying a user of putting of the manuscripts on a paper feeder using a text and a picture for user's easy understanding.

Referring to FIG. 12, a UI window 1200 displays information that indicates the classification state of the manuscripts that are output onto the output bin. Further, if a next command is input from the user, the UI window 1200 may display information in accordance with the next classification state.

For example, if it is assumed that 100 sheets of reusable paper are mixed in a manner that 1 to 40 pages have blank front sides, 41 and 42 pages have both sides already used, 43 to 45 pages have not yet been used, 56 to 76 pages have blank front sides, 77 page has a blank back side, and 78 to 100 pages have blank front sides, first 40 pages are discharged from the ADF, and the UI window 1200 shows guidance indicating that the corresponding pages have blank front sides.

If the user presses "Continue" after bring the discharged 40 pages according to this information, two sheets are discharged and the UI window 1200 guide that the two sheets of manuscripts are unusable.

Further, if the user presses "Continue" after removing the two discharged sheets according to this information, 13 sheets are discharged, and the UI window 1200 guides that the 13 discharged sheets have both blank sides.

Further, if the user presses "Continue" after bringing the discharged paper according to this information, the UI window 1200 guides that 21 sheets are discharged with their front sides blanked. The user may put the discharged sheets together with the previous sheets having blank front sides.

Then, if the user presses "Continue", one sheet of paper is output, and the UI window 1200 guides that the rear side of this sheet is blank. In this case, the user may turn over the discharged paper and may put this sheet together with the previously discharged sheets having blank front sides.

Then, if the user presses "Continue", 23 sheets are discharged to end the discharging, and the UI window 1200 guides that the 23 discharged sheets have front blank sides. Finally, the user may intuitively easily divide and use the dividedly discharged sheets of paper.

Figure 13:
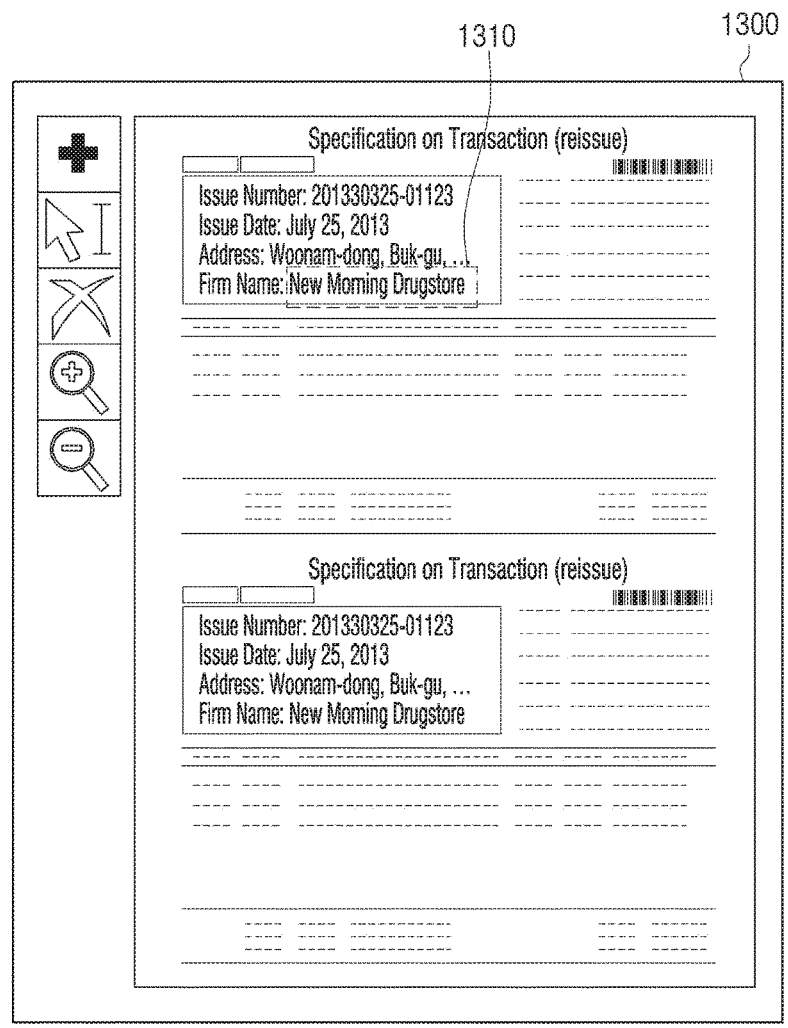

FIG. 13 is a view illustrating an example of a UI window in which an OCR region is set according to an embodiment of the present disclosure.

Referring to FIG. 13, a UI window 1300 displays a scan image of the manuscript. Further, the UI window 1300 receives setting of a predetermined region of the scan image. After the above-described setting is performed, the keyword classification may be performed through performing only the OCR for the corresponding region. That is, the screen as shown in FIG. 13 may be displayed only in the case where the keyword classification is selected.

Figure 14:
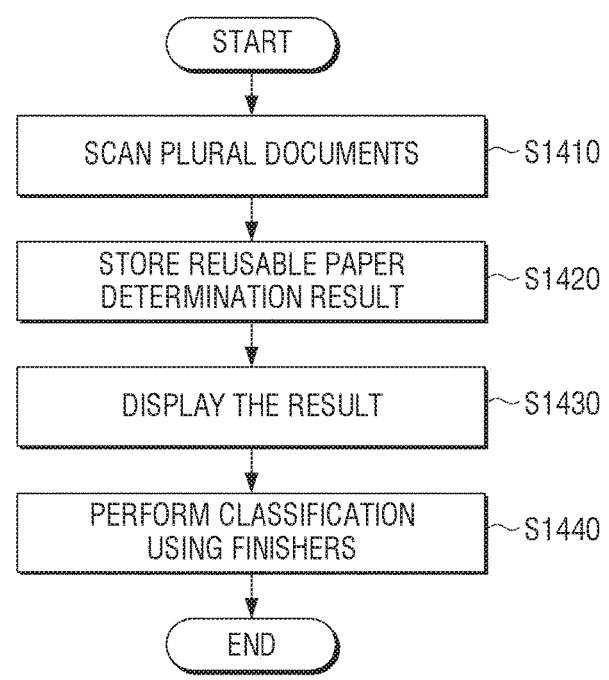
FIG. 14 is a schematic flowchart explaining a method for classifying a document of an image forming apparatus according to an embodiment of the present disclosure.

FIG. 14 is a schematic flowchart describing a method for classifying a document of an image forming apparatus according to an embodiment of the present disclosure.

Referring to FIG. 14, a plurality of manuscripts are first scanned at operation S1410. Specifically, if a scan command or a document classification command is received from the mobile device, or if a scan command or a document classification command is received through a user inputter provided on the image forming apparatus, scanning is performed with respect to the respective manuscripts loaded on the manuscript feeder of the scanner.

Then, classification information of the plurality of manuscripts is generated using the scanning result of the plurality of manuscripts at operation S1420. Specifically, the classification information of the corresponding manuscripts may be generated using the scan images of the respective manuscripts. If the user's classification standard is reusable paper, it is determined whether a printing job on the corresponding side is possible using the scan images of the corresponding manuscripts, and the result of the determination may be generated as the classification information (e.g., usable or unusable state of the scan side). If the scanner may perform double-side scanning, it is determined whether the printing job on the both sides of the manuscript may be performed using two scan images of the manuscript, and the result of the determination may be generated as the classification information. In this case, the classification information may have four classification values (e.g., both sides are unusable, only the front side is usable, only the back side is usable, and both sides are usable).

It is described that the classification information is generated after the scanning of all the manuscripts is completed, the scanning and the classification information generation may be performed in parallel. That is, if the scanning of the first manuscript is completed, generation of the classification information of the first manuscript may be performed while the scanning of the second manuscript is performed.

For manuscript classification using the generated classification information, guide information for the plurality of manuscripts is displayed at operation S1430. Specifically, if output trays (or finishers) are not provided in the image forming apparatus, the guide information for loading the scanned manuscripts again on the manuscript feeder of the scanner may be displayed. Accordingly, if the user loads the manuscripts on the manuscript feeder of the scanner, it becomes possible to output the plurality of manuscripts loaded on the manuscript feeder successively in the unit of manuscripts having the same classification information.

If the output trays are displayed in the image forming apparatus, the guide information for loading the scanned manuscripts on the paper feeder may be displayed, and if the user loads the manuscripts on the paper feeder, the scanned manuscripts are loaded on the output trays corresponding to the classification information among the plurality of output trays at operation S1440.

As described above, the method for classifying a document of an image forming apparatus according to this embodiment may perform the document classification job using the functions that are basically provided in the image forming apparatus, and thus the resources and the maintenance costs may be reduced. The method for classifying a document as illustrated in FIG. 14 may be executed on the image forming apparatus having the configuration of FIG. 2, and may be executed on an image forming apparatus having other configurations.

Further, the method for classifying a document according to the various embodiments may be stored in a non-transitory computer readable medium. Such a non-transitory computer readable medium may be mounted on various devices to be used.

The non-transitory computer readable medium is not a medium that stores data for a short period, such as a register, a cache, or a memory, but means a medium which semi-permanently stores data and is readable by a device. Specifically, various applications and programs as described above may be stored and provided in the non-transitory computer readable medium, such as, a compact disc (CD), a digital versatile disc (DVD), a hard disk, a Blu-ray disc, a USB, a memory card, and a ROM.

Figure 15:
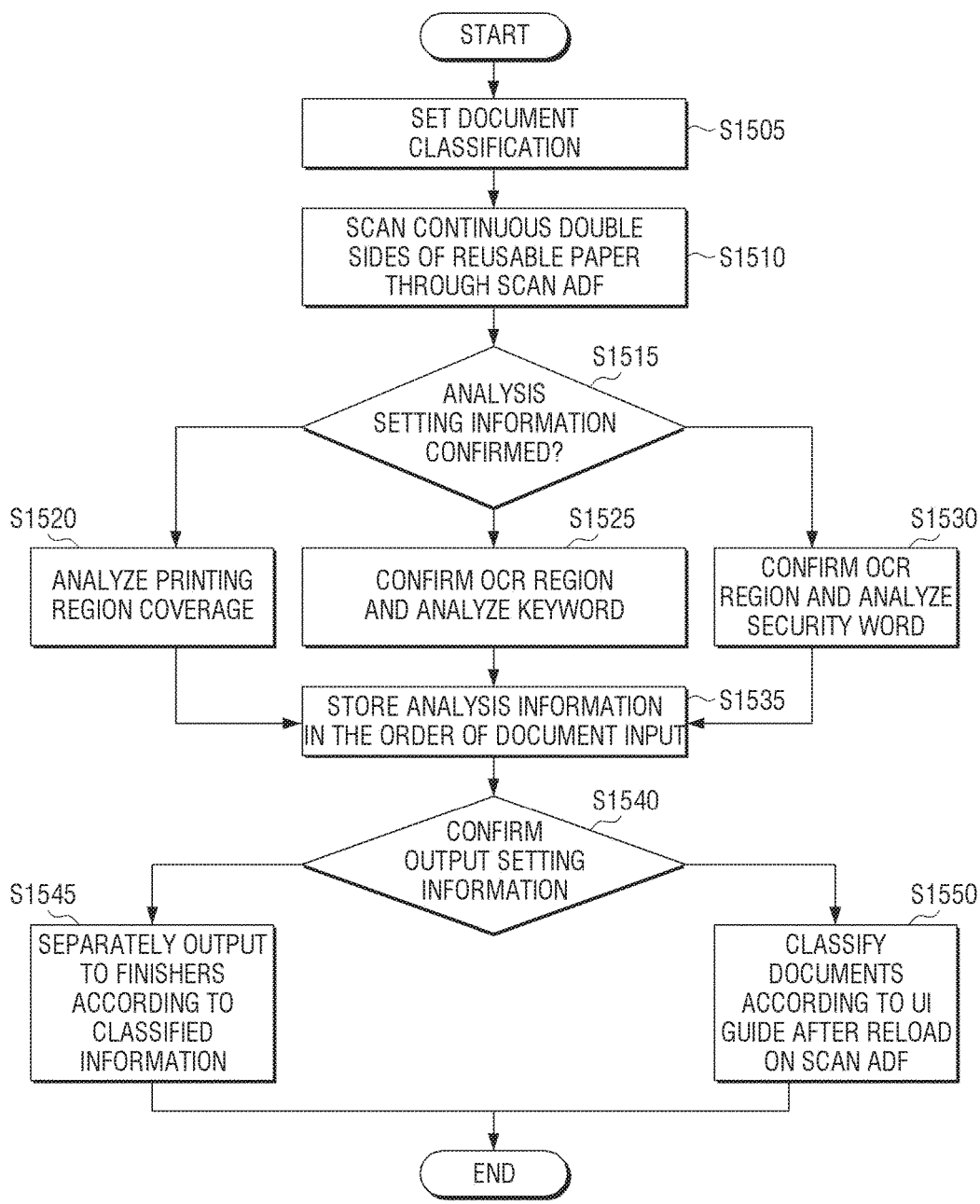
FIG. 15 is a detailed flowchart describing a method for classifying a document of an image forming apparatus according to an embodiment of the present disclosure.

FIG. 15 is a detailed flowchart describing a method for classifying a document of an image forming apparatus according to an embodiment of the present disclosure.

Referring to FIG. 15, a method for classifying a document is set by a user at operation S1505. Specifically, it may be selected whether to perform reusable paper classification and whether to perform contents classification. In the case of the reusable paper classification, it may be selected at what degree the manuscript may be handled as reusable paper, and in the case of the contents classification, a keyword that becomes a certain classification standard may be received as an input.

Scan images of the respective manuscripts may be generated through performing of a scanning job with respect to the manuscripts loaded on the ADF after the method for classifying a document is set by the user at operation S1510. If the ADF is the DADF that may perform double-sided scanning, two scan images may be generated with respect to each manuscript. If the ADF may scan only one side, the scanning job may be primarily performed with respect to only one side of each of the plurality of manuscripts, and the scan-completed manuscripts may be loaded again on the ADF in an opposite direction to generate a double-sided scan image of the manuscript.

If the scan image is generated, the generated scan image is analyzed in accordance with the predetermined method for classifying the document at operation S1515. Specifically, it is determined whether a non-white pixel exists in a print region (i.e., region except an edge region of the manuscript) at operation S1520, and it is determined whether a specific keyword exists through selection of an OCR in a predetermined region at operation S1525. Further, it is determined whether a word, such as a preregistered keyword (e.g., security, secret, or top secret), exists in the overall document region at operation S1530. Such operations may be performed with respect to the manuscripts, and only an operation that corresponds to the method for classifying a document that is set by the user may be performed.

Further, analysis information according to the result of analysis is generated at operation S1535. Specifically, a lookup table as shown in FIG. 4 may be generated with respect to the plurality of manuscripts.

If scanning and analysis of all the manuscripts are completed, the output type is determined and the guide information is displayed at operation S1540. Specifically, if the output trays exist in the image forming apparatus, the guide information for loading the scanned manuscripts on the paper feeder may be displayed, whereas if the output trays do not exist in the image forming apparatus, the guide information for reloading the manuscripts on the scanner may be displayed.

If the output trays do not exist and the user reloads the scanned manuscripts on the ADF, the manuscripts may be output successively in the unit of manuscripts having the same classification information at operation S1550.

If the output trays exist and the user loads the scanned manuscripts on the paper feeder, the respective scanned manuscripts may be loaded on the output trays that correspond to the classification information at operation S1545. This operation will now be described in detail with reference to FIG. 16.

Figure 16:
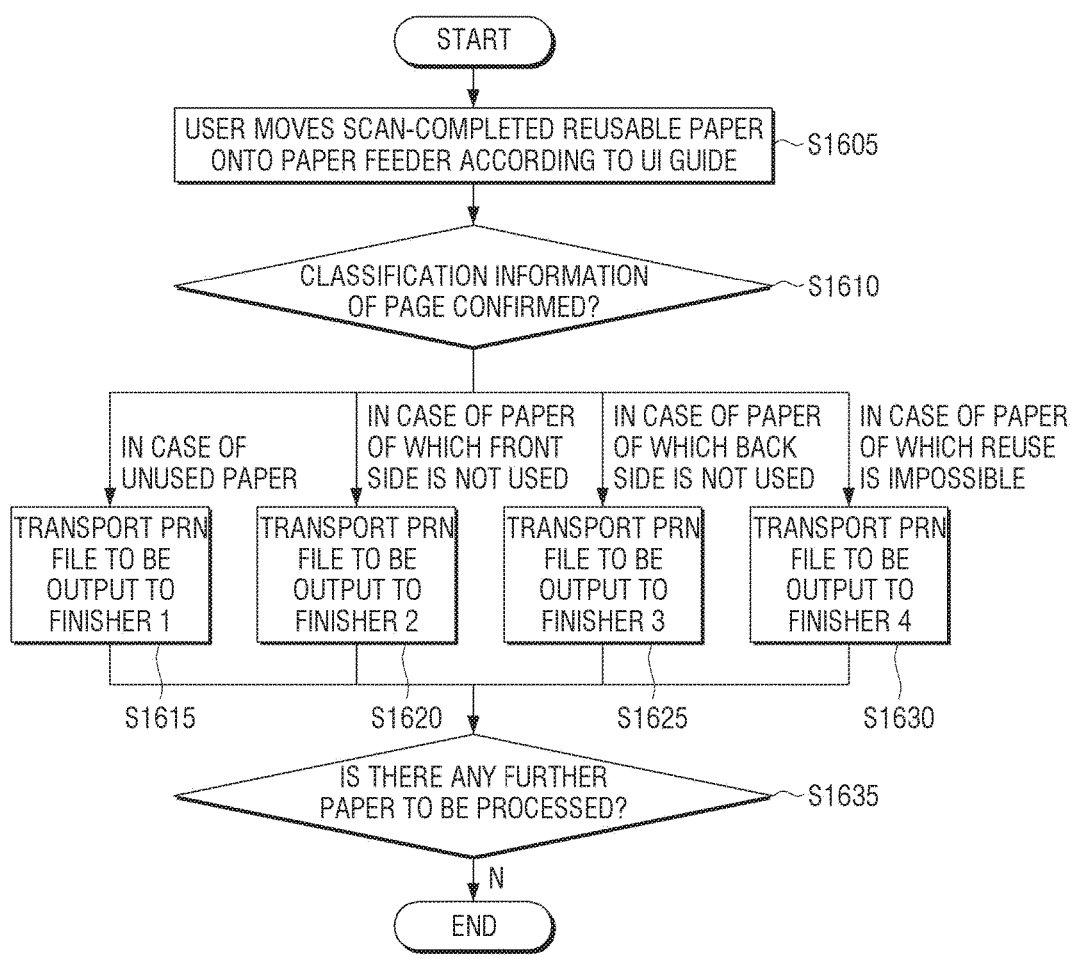
FIG. 16 is a flowchart describing in detail an operation of loading manuscripts on output trays that correspond to classification information of FIG. 15 according to an embodiment of the present disclosure.

FIG. 16 is a flowchart explaining in detail an operation of loading manuscripts on output trays that correspond to classification information of FIG. 15 according to an embodiment of the present disclosure.

Referring to FIG. 16, if the user moves the scan-completed manuscripts onto the paper feeder in accordance with the guide information at operation S1605, the classification information may be confirmed in the order of loading at operation S1610, and the corresponding manuscripts may be transported to the output trays that correspond to the classification information at operations S1615, S1620, S1625, and S1630. Specifically, the manuscript of which both sides are usable may be transported to the first output tray at operation S1615, and the manuscript of which only the front side is usable may be transported to the second output tray at operation S1620. Further, the manuscript of which only the back side is usable may be transported to the third output tray at operation S1625, and the manuscript of which both sides are unusable may be transported to the fourth output tray at operation 51630.

The manuscript having keyword A as the classification standard may be transported to the first output tray, and the manuscript having no keyword A may be transported to the second output tray.

The above-described operation is repeated with respect to all the manuscripts, and if the classification of all the manuscripts is performed at operation 51635, the classification operation may be ended.

If the overall operation is completed, information that notifies what kind of paper is arranged in each tray may be displayed. Accordingly, the user may discard the manuscripts loaded on the fourth output tray, and may turn over the manuscripts loaded on the third output tray to combine the manuscripts with the manuscripts loaded on the second output tray, so that reusable paper accurately aligned in one direction may be obtained.

Figure 17:
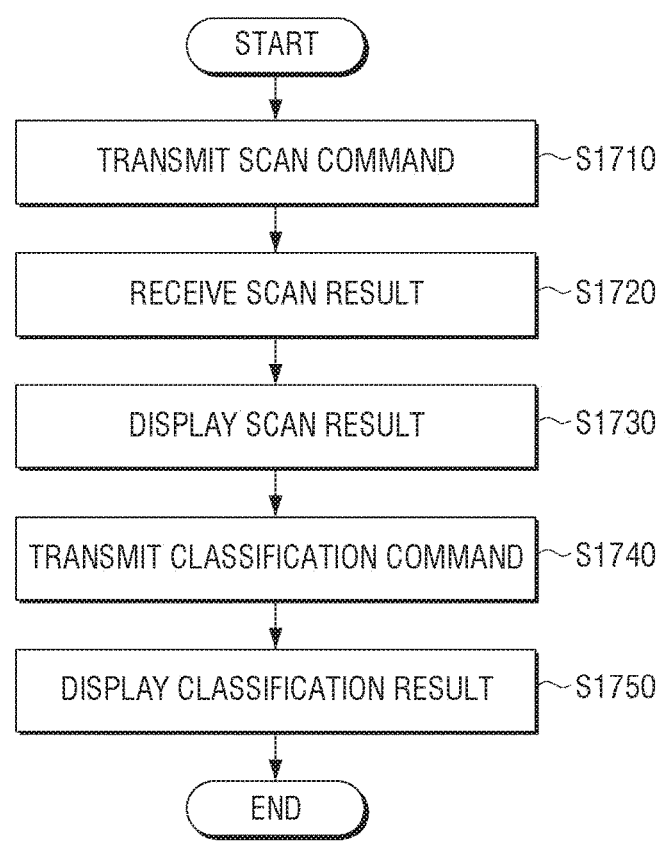
FIG. 17 is a flowchart describing a method for classifying a document of a mobile device according to an embodiment of the present disclosure.

FIG. 17 is a flowchart describing a method for classifying a document of a mobile device according to an embodiment of the present disclosure.

Referring to FIG. 17, if a document classification command is received from the user, a scan command is transmitted to the image forming apparatus at operation S1710. In this case, if the document classification operation is performed in the image forming apparatus side, document classification setting information may be transmitted together with the scan command.

The scanning result of a plurality of manuscripts is received from the image forming apparatus corresponding to the scan command at operation S1720. The scanning result may be a scan image for the manuscript or may be classification information for the scan image. That is, manuscript classification may be performed on the image forming apparatus side, and may be also performed on the mobile device side. Accordingly, in the case of performing the classification on the mobile device side, the scan images may be received as the result of scanning, whereas in the case of performing the classification on the image forming apparatus side, the classification information may be received as the result of scanning.

In the case of performing the classification on the mobile device side, the classification information for the respective manuscripts may be generated using the received scan images.

Further, in order to classify the document using the generated classification information, guide information for the plurality of manuscripts is displayed at operation S1730. Specifically, if output trays (or finishers) are not provided in the image forming apparatus 100, guide information for loading the scanned manuscripts again on the manuscript feeder of the scanner may be displayed. Accordingly, if the user loads the manuscripts on the manuscript feeder of the scanner, a command for outputting the plurality of manuscripts loaded on the manuscript feeder successively in the unit of manuscripts having the same classification information may be transmitted to the image forming apparatus at operation S1740, and the classification state of the currently output manuscripts may be displayed at operation S1750.

If the output trays are provided in the image forming apparatus, the guide information for loading the scanned manuscripts on the paper feeder may be displayed at operation S1730, and if the user loads the manuscripts on the paper feeder, a control command for loading the scanned manuscripts on the output trays corresponding to the classification information among the plurality of output trays may be transmitted to the image forming apparatus 100 at operation S1740, and the classification state of the manuscripts loaded on the output trays may be displayed at operation S1750.

As described above, the method for classifying a document in a mobile device according to this embodiment may perform the document classification job using the functions that are basically provided in the image forming apparatus, and thus the resources and the maintenance costs may be saved. The method for classifying a document as illustrated in FIG. 17 may be executed on the image forming apparatus having the configuration of FIG. 3, and may be executed on a mobile device having other configurations.

Further, the method for classifying a document according to the various embodiments may be stored in a non-transitory computer readable medium. Such a non-transitory computer readable medium may be mounted on various devices to be used.

The at least one processor is further configured to control the display to display the guide information for loading the plurality of scanned manuscripts on a manuscript feeder of the scanner, and control the scanner to output the plurality of manuscripts that are loaded on the manuscript feeder successively in a unit of manuscripts having the same classification information.

The at least one processor is further configured to control the display to display the classification information of the manuscripts that are put on an output bin of the scanner.

The image forming apparatus may further include an image former configured to print the manuscripts using printing paper loaded on a paper feeder and output trays configured to load the printing paper that is output from the image former on any one of the output trays in accordance with a predetermined standard. The at least one processor is further configured to control the display to display the guide information for loading the plurality of scanned manuscripts on the paper feeder, and controls the image former and the output trays for loading the plurality of scanned manuscripts thereon corresponding to the classification information if the plurality of scanned manuscripts are loaded on the paper feeder.

The at least one process is further configured to control the display to provide the classification information of the plurality of trays.

The at least one processor is further configured to generate the classification information through determination of whether the plurality of manuscripts are security documents, and may control the image former to print a predetermined phrase with respect to the manuscripts that are determined as the security documents.

The scanner may be an automatic document feeder (ADF) that scans only one side of the manuscript, and the at least one processor is further configured to generate the classification information using the scanning result of one side of each of the plurality of manuscripts.

The scanner may be a duplex automatic document feeder (DADF) that scans one side and the other side of the manuscript, and the at least one processor is further configured to generate the classification information using the scanning result of both sides of each of the plurality of manuscripts.

The at least one processor is further configured to generate whether each of the plurality of manuscripts is a usable printing paper as the classification information using the scanning result of each of the plurality of manuscripts.

The at least one processor is further configured to generate whether each of the plurality of manuscripts is a usable printing paper as the classification information using the scanning result of each of the plurality of manuscripts.

The at least one processor is further configured to determine whether each of the plurality of manuscripts is the usable printing paper on the basis of at least one of the number of black pixels in a scan image of the manuscript, positions of the black pixels, overall brightness information of the scan image, or color information of the scan image.

The at least one processor is further configured to perform optical character recognition (OCR) with respect to scan images of the plurality of manuscripts and may generate whether a predetermined text exists as the result of the OCR as the classification information.

The at least one processor is further configured to perform the OCR only with respect to a predetermine region of the scan image.

The at least one processor is further configured to control the display to provide the guide information for loading the plurality of scanned manuscripts again on a manuscript feeder of the ADF, and control the communication interface to transmit a control command to the image forming apparatus so as to output the plurality of manuscripts that are loaded on the manuscript feeder successively in a unit of manuscripts having the same classification information using the generated classification information.

The at least one processor is further configured to control the display to display the guide information for loading the plurality of scanned manuscripts on the paper feeder, and control the communication interface to transmit a control command for loading the plurality of scanned manuscripts on output trays corresponding to the classification information to the image forming apparatus.

The display of the guide information comprises displaying the guide information for loading the plurality of scanned manuscripts on a manuscript feeder of the scanner, and the method may further include outputting the plurality of manuscripts that are loaded on the manuscript feeder successively in a unit of manuscripts having the same classification information.

The displaying of the guide information further comprises displaying the guide information for loading the plurality of scanned manuscripts on a paper feeder, and the method may further include loading the plurality of scanned manuscripts on an output tray in which the plurality of scanned manuscripts correspond to the classification information among a plurality of output trays if the plurality of scanned manuscripts are loaded on the paper feeder.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An image forming apparatus comprising:
a scanner to scan a plurality of manuscripts;
a touch screen; and
at least one processor to:
control the touch screen to display a first user interface (UI) for selecting one of a plurality of displayed classification standards,
control the touch screen to display a second UI for selecting one of a plurality of classification output types, the second UI being displayed after receipt of the selection on the first UI,
generate classification information of the plurality of manuscripts using a scanning result of the plurality of manuscripts, and
control the scanner to output the plurality of manuscripts according to the selected classification output type,
wherein the plurality of displayed classification standards comprise two or more of a reusable paper classification, a document keyword classification, a document form classification, or a document security classification, and
wherein the classification information corresponds to the selected classification standard and comprises information related to each of the plurality of manuscripts.

2. The image forming apparatus as claimed in claim 1, wherein the at least one processor:
controls the touch screen to display guide information for loading the plurality of scanned manuscripts on a manuscript feeder of the scanner, and
controls the scanner to output the plurality of manuscripts that are loaded on the manuscript feeder successively in a unit of manuscripts having same classification information.

3. The image forming apparatus as claimed in claim 2, wherein the at least one processor controls the touch screen to display the classification information of the manuscripts that are put on an output bin of the scanner.

4. The image forming apparatus as claimed in claim 1, further comprising:
an image former to print the manuscripts using printing paper loaded on a paper feeder; and
output trays to load the printing paper that is output from the image former on any one of the output trays,
wherein the at least one processor:
controls the touch screen to display guide information for loading the plurality of scanned manuscripts on the paper feeder, and
controls the image former and the output trays for loading the plurality of scanned manuscripts thereon corresponding to the classification information if the plurality of scanned manuscripts are loaded on the paper feeder.

5. The image forming apparatus as claimed in claim 4, wherein the at least one processor outputs the plurality of scanned manuscripts through null printing if the plurality of scanned manuscripts are loaded on the paper feeder.

6. The image forming apparatus as claimed in claim 4, wherein the at least one processor controls the touch screen to display the classification information of the plurality of trays.

7. The image forming apparatus as claimed in claim 1, wherein the scanner comprises an automatic document feeder (ADF) that scans only one side of the manuscript, and
wherein the at least one processor generates the classification information using the scanning result of one side of each of the plurality of manuscripts.

8. The image forming apparatus as claimed in claim 1, wherein the scanner comprises a duplex automatic document feeder (DADF) that scans one side and the other side of the manuscript, and
wherein the at least one processor generates the classification information using the scanning result of both sides of each of the plurality of manuscripts.

9. The image forming apparatus as claimed in claim 1, further comprising an image former,
wherein, when the selected classification standard includes the document security classification, the at least one processor controls the image former to print a predetermined phrase with respect to the manuscripts that are determined as the security documents.

10. The image forming apparatus as claimed in claim 1, wherein, when the selected classification standard includes the reusable paper classification, the at least one processor determines whether each of the plurality of manuscripts is the usable printing paper on the basis of at least one of the number of black pixels in a scan image of the manuscript, positions of the black pixels, overall brightness information of the scan image, or color information of the scan image.

11. The image forming apparatus as claimed in claim 1, wherein, when the selected classification standard includes the document form classification, the at least one processor:
performs optical character recognition (OCR) with respect to scan images of the plurality of manuscripts, and
determines whether a predetermined text exists as the result of the OCR.

12. The image forming apparatus as claimed in claim 11, wherein the at least one processor performs the OCR only with respect to a predetermined region of the scan image.

13. A method for classifying a document of an image forming apparatus, the method comprising:
receiving, on a first user interface (UI), a selection of one of a plurality of displayed classification standards;
receiving, on a second UI that is displayed after receipt of the selection on the first UI, a selection of one of a plurality of displayed classification output types,
scanning a plurality of manuscripts;
generating classification information of the plurality of manuscripts using a scanning result of the plurality of manuscripts; and
outputting the plurality of manuscripts according to the selected classification output type,
wherein the plurality of displayed classification standards comprise two or more of a reusable paper classification, a document keyword classification, a document form classification, or a document security classification, and
wherein the classification information corresponds to the selected classification standard and comprises information related to each of the plurality of manuscripts.

14. The method as claimed in claim 13, further comprising:
- displaying guide information for loading the plurality of scanned manuscripts on a manuscript feeder of the scanner; and
- outputting the plurality of manuscripts that are loaded on the manuscript feeder successively in a unit of manuscripts having same classification information.

15. The method as claimed in claim 13, further comprising:
- displaying guide information for loading the plurality of scanned manuscripts on a paper feeder; and
- loading the plurality of scanned manuscripts on an output tray in which the plurality of scanned manuscripts correspond to the classification information among a plurality of output trays if the plurality of scanned manuscripts are loaded on the paper feeder.

16. The method as claimed in claim 13, further comprising, when the selected classification standard includes the document security classification, printing a predetermined phrase with respect to the manuscripts that are determined as the security documents.

17. The method as claimed in claim 13, further comprising, when the selected classification standard includes the reusable paper classification, determining whether each of the plurality of manuscripts is the usable printing paper on the basis of at least one of the number of black pixels in a scan image of the manuscript, positions of the black pixels, overall brightness information of the scan image, or color information of the scan image.

18. The method as claimed in claim 13, further comprising, when the selected classification standard includes the document form classification:
- performing optical character recognition (OCR) with respect to scan images of the plurality of manuscripts; and
- determining whether a predetermined text exists as the result of the OCR.

* * * * *